(12) United States Patent
Mikkonen et al.

(10) Patent No.: US 7,932,378 B2
(45) Date of Patent: Apr. 26, 2011

(54) STARCH-BASED COMPOSITION AND PROCESS FOR THE PRODUCTION THEREOF

(75) Inventors: Hannu Mikkonen, Rajamäki (FI); Kyösti Valta, Tampere (FI); Eino Sivonen, Ruutana (FI); Soili Peltonen, Rajamäki (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 666 days.

(21) Appl. No.: 10/532,398

(22) PCT Filed: Oct. 24, 2003

(86) PCT No.: PCT/FI03/00796
§ 371 (c)(1),
(2), (4) Date: Oct. 12, 2005

(87) PCT Pub. No.: WO2004/037864
PCT Pub. Date: May 6, 2004

(65) Prior Publication Data
US 2006/0128889 A1 Jun. 15, 2006

(30) Foreign Application Priority Data
Oct. 25, 2002 (FI) ...................................... 20021904

(51) Int. Cl.
*C08B 31/10* (2006.01)
*C08B 31/16* (2006.01)
(52) U.S. Cl. ......................... 536/124; 536/108; 536/111
(58) Field of Classification Search .................. 536/108, 536/111, 124
See application file for complete search history.

(56) References Cited

U.S. PATENT DOCUMENTS 3,346,558 A * 10/1967 Claris ........................... 536/18.6
3,399,190 A * 8/1968 Fuzesi et al. .................. 536/108
4,011,389 A 3/1977 Langdon
5,861,461 A 1/1999 Lee et al.

FOREIGN PATENT DOCUMENTS

| DE | 197 14 166 A1 | 10/1998 |
| EP | 1 148 067 A1 | 10/2001 |
| WO | WO-03/068823 A1 | 8/2003 |
| WO | WO-03/068884 A1 | 8/2003 |

OTHER PUBLICATIONS

Leitheiser et al. Ind. Eng. Chem. Res. Dev., 1966, 5(3), p. 276-282.*
M. Biermann et al., Starch/Starke, 45 (1993) Nr. 8. pp. 281-288.
M. M. Bean et al., Food Prod. Dev., 1973, vol. 7, pp. 30-32.
W. J. McKillip et al., Journal of Paint Technology, vol. 42, No. 544, May 1970, pp. 312-319.
P. E. Throckmorton et al., Journal of American Oil Chemists' Society, vol. 51, Nov. 1974, pp. 486-494.
F. H. Otey et al., The Journal of American Oil Chemists' Society, vol. 40, Feb. 1963, pp. 76-79.
Carr, "Starch-deprived glycol and glycerol glucosides prepared by reactive extrusion processing", Journal of Applied Polymer Science, vol. 42, 1991, pp. 45-53.
Carr, "Preparation of starch derivatives by reactive extrusion", Society of Plastics Engineers, Technical Conference (52: San Francisco:1994), vol. 2, 1994, pp. 1444-1448.
Subramanian et al., "Glycol glucosides process synthesis by reactive extrusion with a static mixer as postextruder reactor", Cereal Chem., vol. 73, No. 2, 1996, pp. 179-184.
Graaf et al., "Quantitative analysis of chemically modified starches by 1H-NMR spectroscopy", Starch/Starke, vol. 47, No. 12, 1995, pp. 469-475.
Carr et al., "Glycol glucoside extrudate from cornstarch as the polyether polyol for polyurethane foam preparation", Polymer Preprints, vol. 33, No. 1, 1992, pp. 946-947.
Carr et al., "Glycol glucosides from starch by continuous twin-screw extruder processing", Cereal Chem., vol. 66, No. 3, 1989, pp. 238-243.
Chemical Abstracts vol. 114; 84187 (1991).
Chemical Abstracts vol. 123; 173293 (1994).
Chemical Abstracts vol. 124; 53985 (1997).
Chemical Abstracts vol. 124; 315305 (1997).
Chemical Abstracts vol. 137; 383981 (2002).

* cited by examiner

*Primary Examiner* — Shaojia Anna Jiang
*Assistant Examiner* — Jonathan S Lau
(74) *Attorney, Agent, or Firm* — Birch, Stewart, Kolasch & Birch, LLP

(57) ABSTRACT

A process for manufacturing transglycosylation products. According to the process, a starch derivative is reacted at acidic conditions with an alkanol containing 1-6 hydroxyl groups and the reaction product is recovered as such or it is subjected to further processing. According to the method, the transglycosylation reaction between the starch derivatives and the alkanol is carried out in a reactive extrusion process, whereby the reaction can essentially be performed in the absence of liquid media at high yield. The invention also relates to new transglycosylation products of starch derivative, containing anions derived from a phosphorus-containing acid, which are chemically bonded to the product.

24 Claims, No Drawings

STARCH-BASED COMPOSITION AND PROCESS FOR THE PRODUCTION THEREOF

The present invention concerns a method in accordance with the preamble of claim 1 for manufacturing starch compositions.

According to a method of this kind, an ester or ether derivative of starch is reacted at acidic conditions with an alkanol containing 1 to 6 hydroxyl groups, and the reaction product is recovered as such or subjected to further processing.

The invention also concerns new starch-derivative-based compositions according to claim 19 and use according to claim 21.

In terms of its chemical functionality, native starch is a simple compound containing three hydroxyl groups per glucose unit. The polymer components of native starch are amylose and amylopectin. The mutual relations and molecular weights of these polymers can vary according to the species of the plant. Amylose is a linear polymer in which the glucose units are interconnected by means of 1-(alfa)$_4$ glycoside bonds. In addition to this, amylopectin, which is the main branched component of starch, contains 1-(alfa)-6 glycoside bonds. Of native starches, potato starch contains additionally orthophosphoric acid esterified at position C-6, its average amount being 1 phosphate group per 200-400 glucose units. The anionic character of these phosphate groups has been used to explain the superior stability of potato-starch water dispersions as compared to other native starches.

Traditionally, chemically produced phosphoric acid esters of starch have been used for purposes such as enhancing the bonding strength of neoprene-rubber-based latex glues and the setting rate of these glues.

Transglycosylation products of starch are known per se. Native starch has been used in manufacturing transglycosylation products by reacting starch with different alcohols, such as methanol, ethanol, butanol, ethylene glycol, propylene glycol or glycerol, at acidic conditions, whereupon alkyl or hydroxyalkylglucoside compounds are formed, and which in this context are referred to as transglycosylation products. In these, an alkyl or hydroxyalkyl group is attached to position C-1 of the anhydroglucose. Corresponding compounds have also been made from the monomer of starch, i.e. from glucose.

In known art, aimed at oligomeric products, transglycosylation has been used to first produce butylglucosides. The starting material in the manufacturing process is glucose or starch. With starch as starting material, it has been necessary to use a pressure of $4 \times 10^5$ Pa and a temperature of 120° C. With glucose as starting material, it has been possible to apply normal pressure.

Butylglucosides or methylglucosides have been used further in manufacturing alkylpolyglucosides by reacting butylglucosides or methylglucosides at acidic conditions with another alcohol, usually an alcohol with long carbon chain. Then the alcohol (butanol or methanol) used in the first stage of the reaction is replaced by the second stage alcohol with a long carbon chain. The pressure applied in the second stage is $2 \times 10^3$ Pa.

The length of the anhydro glucose chain—expressed as degree of polymerisation, DP,—is 1-7, i.e. its molecular weight is a maximum of 1135+the alkyloxide chain of the hydroxyl compound.

The above technique is described in the publication by Mannfred Biermann, Karl Schmidt and Paul Schulz, "Alkylpolyglukoside-Technology und Eigenschaften", Starch/Stärke 45 (1993) Nr. 8, pp. 281-288.

The transglycosylation technique has also been used in manufacturing surface-active materials by employing a slightly different reaction route. Thus, when using diol or glycerol, transglycosylation has been performed up to the monomer degree; subsequently the product obtained has been treated in a second stage with ethylene oxide or propylene oxide to produce a polyether chain, and the third stage has been constituted by esterification of the hydroxyalkyl ether with a fatty acid. This has resulted in a fatty acid ester of polyalkoxylated polyol glucoside (M. M. Bean, C. L. Mehltretter, C. A. Willham and T. A. McGuire, "Fatty Acid Esters of Polyalkoxylated polyol glycosides as bread additives", Food Prod. Dev. 1973. Vol. 7, p. 30-32; F. H Ottey, C. L. Mehltretter, C. E. Rist, "Polyoxyethylene Ethers of Some Polyol Glycosides and Their Fatty Esters", J. Am. Oil Chem. Soc., 1963, Vol. 40, p. 76-78; and Peter E. Throcmorton, Richard R. Egan and David Aelony, Gayle K. Mulberry, Felix H. Otey "Biodegradable Surfactants Derived from Corn Starch", J. Am. Oil. Chem. Soc., 1974, Vol 54, p. 486-494).

Solutions related to transglycosylation have also been presented in patent literature. Thus, U.S. Pat. No. 4,011,389 dicloses how non-ionic, surface-active materials can be manufactured using starch or dextrose by performing transglycosylation using propylene glycol or methoxyethanol, and subsequently by causing the product to react with an alkyl epoxide, e.g. 1,2-epoxydecane, or other epoxy compounds.

DE Patent No. 19714166 deals with transglycosylation of potato starch with glycerol and using sulpho succinic acid as a catalyst. The molecular weight of the product is 16,000 g/mol. It was used as a 16% solution in the above application.

In addition to being used as surface-active materials, the transglycosylation products of starch have also been proposed for other uses. When manufacturing alkyds, the first step is to perform the transglycosylation reaction with ethylene glycol to monomer degree and then making various alkyd resins from the product (W. G. Mckillip, J. N. Kellan, C. N. Impola, R. W. Buckney "Glycol Glycoside in Alkyds" J. Paint. Technol. Vol. 42, No. 544, May 1970, p. 312-319).

The ethylene-glycol- and glycerol-based transglycosylation products of starch have also been used in manufacturing polyurethane foams, which are rigid when they are polyetherised. Transglycosylation has been performed in known ways and the product has been reacted with propylene glycol in order to manufacture a polyether, and this has then been used as the polyol component in reaction with diisocyanates.

According to FI Patent Application No. 20020317, the monomeric and oligomeric transglycosylation products of starch and polyols are used in starch glues having a high content of dry solids.

For the sake of completeness, it should be mentioned that the transglycosylation of starch with diols and polyols, such as ethylene glycol and glycerol, has been performed by employing extrusion technique. Ethylene glycol glucosides produced using extrusion technique have been further processed with propylene glycol to produce a polyether, and this has been used for manufacturing polyurethane foams.

FI Patent Application No. 20020313 discloses transglycosylation of starch derivatives, in particular transglycosylation of starch acetates, with diols and polyols, e.g. ethylene glycol and glycerol, whereupon acetylated 1-hydroxy alkyl (poly acetyl glukocides) are obtained as reaction products. According to this solution, the transglycosylation products of starch acetate are manufactured by reacting starch acetate in the presence of an acidic catalyst with an excess amount of diol at a temperature of 120-140° C.

Summarizing, it can be stated that transglycosylation products are made from native starch and native starch acetate, whereupon the reaction is performed at conditions which cause the starch chain to fragment into anhydroglucose units, anhydroglucose oligomers or similar acetylated products. According to FI Patent Application No. 20020313, acetyl group substitution is controlled in the anhydroglucose units. Alkyl polyglucosides have been useful as surface-active substances. The transglycosylation products of starch acetate are useful in the manufacturing of starch-based hot-melt adhesives and poly(acetyl anhydroglucose)-polyesther copolymers. Another known application is that of using water-soluble, monomeric methyl glucosides as hot-melt adhesives.

The technical state of the art has a number of flaws, which restrict the applicability of the known products. The monomers and oligomers manufactured from native starch by means of transglycosylation are water-soluble as surface-active substances should be, and thus they are not suitable as such for applications requiring the ability to withstand water or to serve as effective barriers to water vapour.

Due to the reaction temperature of transglycosylation, the acid catalyst and long reaction time, many known compositions are coloured and their solutions must be separately bleached using active carbon before they can be used.

In addition to the OH group of 4-carbon, the anhydroglucose unit obtained from native starch has three free hydroxyl functionalities. This is the reason why the use of such a transglycosylated monomer as a polymer unit in polymerisation leads to an uncontrollable situation, in which the polymer chain may grow from any hydroxyl. Often the result is differently branched, cross-bridged structures. The natural polymer structure of starch and its high molecular weight impose restrictions on the ability to process new polymers.

The esterification of the OH groups in starch (e.g. by using acetyl groups) enhances thermal permanence of the polymer and significantly improves its water resistance. However, the applicability of known starch-based hot-melt glue compositions has been restricted thus far by the fact that the thermal stability of hot-melt glue compositions is inferior to that of synthetic polymers. As a result, several starch hot-melt glue compositions require the addition of antioxidants or other substances enhancing thermal stability.

The high molecular weight of native starches or their derivatives is the main reason why excessive amounts of alcohol components have to be used in transglycosylation in order to achieve a sufficiently low viscosity and mixing effect. Process costs are increased by the need to dispose of the extra unreacted alcohol component by washing or distilling. Moreover, it is necessary to eliminate/neutralise the acidic compound needed at the process stage as a reaction catalyst.

It is an aim of the present invention to eliminate the problems related to the known art and to provide new starch-based products, which are more easily applicable and cheaper than native starch for purposes such as gluing technology, coating technology and as raw material of polymers.

The invention is based on the idea that transglycosylation products are made from starch derivatives, such as esters or ethers, using a continuous mechanical-chemical extrusion process, in which an alcohol component, as well as a catalyst if so desired, is bound to a transglycosylation product by means of a chemical bond.

Our tests have been performed mainly using starch esters and, to our surprise, we have found that the amount of chemicals needed can be reduced by more than 95% compared to the known art. The available transglycosylation products possess improved technical properties compared to the conventional technique.

The present invention enables the creation of totally new products, composed of a starch derivative transglycosylation product containing anions derived from phosphorus-containing acid, which are chemically bound to the product. These can be used in polymerisation.

More specifically, the process according to the invention is mainly characterised by what is stated in the characterising part of claim 1.

The product according to the invention is characterised by what is stated in the characterising part of claim 19.

The use according to the invention is characterised by what is stated in claim 21.

By means of the invention considerable advantages are gained when compared to the known art. 1 to 5 mass-% of diol of the initial substance starch is entirely sufficient to produce the acetylated glucose polymer, which has a molecular mass on the order of approx. 10,000 g/mol, hydroxy alkyl group number being approx. 3 mol-% (corresponds to approx. 1 mass-% of bound diol). With hypophosphorous acid as the catalyst, the applicable processing temperature, without damaging the product, can be within the range of 170-190° C. Temperatures higher than this can, of course, be used to shorten the required retention time.

The reactive extrusion system can be used to homogenise the mass and enhance the penetration of chemicals into the starch particles prior to the actual reaction. Mechanical treatment replaces the use of chemical substances.

The invention can be used to achieve a significant conversion with respect to the diols and catalysts used as starting materials. Consequently, the diols and catalysts used in technical products as reagents do not necessarily need to be removed from the reaction mixture. Because of the improved reaction efficiency, the reaction results in the formation of only minimal amounts of monomeric reaction products, which have the effect of lowering the yield of the desired polymeric transglycosylation product.

The most important adhesive applications of the transglycosylated products based on starch esters having a high degree of substitution (DS>1), e.g. starch acetates, are hot-melt glues, which enable users to benefit from their capability of withstanding water.

The products obtained through the application of the present invention are new when, in addition to the ester groups, they contain a phosphate or phosphite function. These new products have surprising and highly valuable properties. They can, for instance, be used as reagents in polymerisation since they usually have only two (or a maximum of three) free hydroxyl functions via which they can react. Therefore they constitute a linear or only slightly cross-linked polymer structure block.

Surprisingly, the substitution distribution of the product obtained by using the extrusion technique is different to that obtained by batch processing. For example, the acetyl group is hydrolysed from the C6 carbon in the batch process, but in extrusion-technology-based manufacturing this does not happen. Instead, the DS level is preserved and no acetyl groups are cleaved off the C6 carbon. In addition to the product being different, the degree of substitution preserved at the original level improves the yield.

In the following, the invention will be examined in more closely with aid of a detailed description and some working examples.

As stated above, the starch-based component of the invention is a "functional starch derivative." This refers to a product obtained from starch by a chemical reaction and whose anhydroglucose units include groups, which modify the hydroxyl functions (see above). The starch derivative is typically a starch ester, a starch ether, a mixed ester/ether of starch or a grafted starch manufactured using native starch, hydrolysed starch, oxidised starch, cross-linked starch or gelatinated starch. The starch can be based on any given native starch with an amylose content of 0-100% and amylopectin content of 100-0%. Thus, the starch can be obtained from barley, potato, wheat, oats, peas, sweetcorn, tapioca, rice, sago or other such tuber or cereal plants.

The starch derivative used in the invention is especially preferably based on the products made from these native starches through oxidation, hydrolysation, cross-linking, grafting, cationization, etherification or esterification.

It has been found to be suitable to use a starch-based component obtained from the ester formed by starch and one or more aliphatic $C_{2-24}$-carboxyl acids. The carboxylic acid component of this kind of ester can then be derived from a lower alkane acid, such as acetic acid, propionic acid or butyric acid or their mixture. However, the carboxylic acid component may also originate from a natural saturated or non-saturated fatty acid. Examples of these are palmitinic acid, stearic acid, oleic acid, linolic acid and their mixtures. An ester can also consist of both long- and short-chained carboxylic acid components. An example of this is the mixed ester of acetate and stearate. In addition to using acids, corresponding acid anhydrides and acid chlorides and other such reactive acid derivatives can also be used in a known way in forming esters.

Examples of the manufacturing of fatty acid esters of starch are provided in the following publications: Wolff, I. A., Olds, D. W. and Hilbert, G. E., The Acylation of Corn Starch, Amylose and Amylopectin, J. Amer. Chem. Soc. 73 (1952) 346-349 and Gros, A. T. and Feuge, R. O., Properties of Fatty Acid Esters of Amylose, J. Amer. Oil Chemists' Soc 39 (1962) 19-24.

The examples below illustrate the present invention mainly by using the transglycosylation products of starch acetates as an example. Starch acetate can be manufactured by reacting starch with acetanhydride in the presence of a catalyst. An example of a catalyst is 50% sodium hydroxide. Other known manufacturing methods of acetates presented in the literature are also suitable for the manufacture of starch acetate. By varying the amount of acetic acid anhydride, the amount of the alkali used as the catalyst, and the length of the reaction time, it is possible to manufacture starch acetates of different degrees of substitution. An example of a suitable manufacturing process is the method disclosed in FI Patent 107386, in which esterification is performed subject to pressure.

An advantageous embodiment involves a starch component consisting of esterified starch, most preferably starch acetate, whose degree of substitution is 0.5-3, preferably 1.5-3, and most appropriately 2-3.

According to another advantageous embodiment, the starch component is a hydroxyl-alkylated starch or its ester. Then, hydroxypropyl starch is especially advantageous; the molar degree of substitution is no more than 1.4, preferably no more than 1, and hydroxypropyl starch esters possessing a molar degree of substitution of no more than 1.4, preferably no more than 1, and especially preferably 0.1-0.8, with a degree of substitution of at least 2, and preferably 2.5-3.

Transglycosylation products are made from the above-mentioned starch derivatives by reacting the derivative at acidic conditions with an alkanol containing 1-5 hydroxyl groups, and by recovering the reaction product, or by subjecting it to further processing, which can be a further new reaction stage or mixing stage.

Usually, the desired amount of a mixture of the mono-, di- or triol and the acidic catalyst is mixed with a starch ester as an aerosol, then mechanical energy and heat are supplied to the reaction mixture, and the reaction of the starch ester with the mono-, di- or triol is carried out as a continuous process in the extrusion equipment until a polymer melt is obtained as end result. The reaction can be controlled by adjusting the temperature of the different zones of the extrusion equipment.

According to the invention, the transglycosylation reaction is preferably achieved by forming an aerosol of the mixture of alcohol and acidic substance, which is then evenly added to a powder-like starch derivative at a dosage corresponding to the desired molar mass of the end product. The powder can also be mechanically compacted before the reaction stage in compaction equipment, prior to carrying out the reaction stage and mixing by using the extruder.

The alcohol component used is in particular a lower alkanol, which has 1-6 carbon atoms and 1-5 hydroxyl groups, especially 1-3 hydroxyl groups. Methanol, ethanol, n-propanol, isopropyl alcohol, n-butanol and sec. butanol, substituted lower alcohols, e.g. metoxy ethanol, etoxy ethanol, metoxy methanol and etoxy methanol, and alcohols containing 2 or 3 hydroxyl groups, e.g. ethylene glycol, propylene glycol and glycerol can be mentioned as examples.

Depending on the number of hydroxyl groups, the amount of the alcohol component used is usually 0.01-20 weight-% of the mass of the carbohydrate component. Usually, 0.1-10% by weight of ethylene glycol or propylene glycol of the starch ester or starch ether is a suitable amount.

The acid catalysts used in the transglycosylation reaction include, by way of examples, strong mineral acids, such as sulphuric acid, hydrochloric acid, nitric acid, strong organic acids, such as paratoluene sulphonic acid, methane sulphonic acid, benzene sulphonic acid and trifluoromethane sulphonic acid and mono- or polyalkylated aryl mono- or polysulphonic acid, such as xylene sulphonic acid or cumene sulphonic acid and dodecyl benzene sulphonic acid, and acidic ion exchange resin. The acid catalyst is typically used in amounts which range from approx. 0.0005 to approx. 5 mole-%, preferably from approx. 0.002 to approx. 2.0 mole-%, and in particular from approx. 0.015 to 0.3 mole-% of the amount of carbohydrate used.

A particularly preferred embodiment of the invention comprises using phosphorus-containing acid, such as phosphoric acid $H_3PO_4$, hypophosphorous acid $H_3PO_2$ or phosphorous acid $H_3PO_3$, as catalyst. During the reaction, the anion of the acid binds to the transglycosylation product as the molar mass of the starch is reduced. This is why the amount of phosphoric acid or its derivative decreases as the reaction progresses. Even though the products retain the basic properties of the reagent, the bonding of phosphoric acids with the reaction product during transglycosylation is a benefit. An example of the effect of phosphoric acid catalysis is the lack of colour and improved heat resistance of the end product.

The fragmentation of starch acetate by applying transglycosylation, continuous mechano-chemical or extrusion-technical process was previously unknown. For example, the extrusion technique used in this invention can, in practice, be carried out using the reactive extrusion system, which has the following stages:

1. Dosage of Chemicals into Finely-Ground Starch

The chemicals, i.e. the alkanol and the acidic catalyst, are mixed into powdery starch. This is performed most preferably in a separate fluidised-bed-type mixing device, for which several different models are commercially available, including the Norwegian Forberg device. The liquid chemicals are dosed into this device in the form of a mist using a suitable nozzle. The drop size of the aerosol is preferably within the range of 100-10,000 nm. Where necessary, surface-active substances can be mixed into the liquid due to be sprayed. Powdery chemicals are added in finely-ground form, preferably after liquid chemicals have been added. The particle size of the powdery components is usually within the range of approx. 0.001-5 mm, and preferably within the range of approx. 0.01-1 mm. The concentration of the liquid chemicals is chosen so that the total amount of liquid remains sufficiently small, in this case typically less than 30%, and preferably approx. 5-25% of the dry matter. This improves the process in the extruder.

2. Compacting Pre-Mixed Mass

The premixed mass can be compacted and granulated if necessary. This enhances the progress of the mass within the extruder feed area and increases yield. Several different kinds of compactors are commercially available; one example is the German-made Kahl.

3. Extrusion

The mixed mass is then fed into an extrusion-technical equipment in which the reaction stage takes place.

The extruder may comprise 1 or 2 screws. The 1-screw extruder is preferred due to its simple structure and lower costs. The screw of the 1-screw extruder may be a simple transporting screw, often with separate mixing parts, e.g. of the Maddock type, and post-feed-zone compression, e.g. in the ratio of 1:1.5-1:10, preferably approx. 1:2-1:4, and typically approx 1:3. It is easy to run relatively dry starch-and-chemical mixtures through the screw extruder if there is sufficient volume in the feed area of the screw and if the mass is not excessively hot, e.g. the jacket of the feed zone is cooled.

The extruder jacket is equipped with conventional heating coils, fitted after the feed zone. In cases of high acidity of the processed mass, the materials used in constructing the screw and jacket must be chosen accordingly. The extruder nozzle is chosen mainly on the basis of further processing requirements. Ordinarily, the mass is either cooled and granulated or applied directly.

The temperature of extrusion is generally within the range of approx. 105-200° C., and preferably within the range of approx. 110-190° C.

Typically, when processing a relatively dry starch-and-chemical mixture, and especially when using a 1-screw extruder, high pressure cannot be created. Due to this, a relatively large nozzle tool is used in the extruder proper, and if pressure is needed, the pressure is raised using a separate hot-melt pump fitted after the extruder. Granular forms can be run through consecutively-placed extruders if the quality of the product and the properties developed with each processing are suitable. Where necessary, the mass can be ground after cooling, washing and drying, case by case.

The compacted and granulated reaction mixture can also be fed into a kiln in which transglycosylation takes place in the starch polymer granules.

4. Post-Treatment

The transglycosylation products to be obtained can be led to an additional reaction or they can be formulated for further use. Ordinarily, the mass is either cooled and granulated or is applied directly to the target. The granular form can be run through consecutively-placed extruders if the quality of the product and the properties developed are suitable. Where necessary, the mass can be ground after cooling, washing and drying, case by case. One common practice is to recover the reaction product by precipitation into water and separation of the sediment, which is then washed and dried. Because the amount of alkanol is small and no liquid mediums are used, this invention does not require the alkanol to be evaporated after the reaction.

As becomes apparent from the following, a particularly advantageous area of use for the new products is hot-melt glues, manufactured using a plasticizing substance mixed into the transglycosylation products. The amount of the plasticizing substance is suitably 0.01-95 weight %, preferably approx. 1-50 weight %, typically approx. 30-50 weight % of the weight of the composition. Any monomeric or polymeric plasticizing substances can be used. However, monomeric plasticizing substances are preferred, e.g. one or more of the following: triacetin, diacetin, monoacetin, triethyl citrate, tributyl citrate, acetyl triethyl citrate, acetyl tributyl citrate, dimethyl succinate, diethyl succinate, oligoester of succinic acid and diol, ethyl lactate, methyl lactate, fatty ester of glycerol, castor oil, olive oil, rapeseed oil, tall oil, dibutyl phthalate, and diethy phthalate.

Properties of TG Products

The invention enables the production of products with extremely interesting properties. By varying the conditions, reaction times and quantities of reagent in transglycosylation reactions, the molecular weight of the product and the contents of the esterification group (e.g. of acetyl), can be determined, which enables, for example, the properties of the glue to be varied (see below), i.e. viscosity, adhesiveness, melting point, hydrophobicity). With the present invention, control over the molecular mass of the starch takes place by adjusting the temperature, catalyst, retention time and production equipment, e.g. length of the screw conveyor.

We have found that the functional groups added to the starch derivative, especially ester groups together with phosphoric acid substitutes, protect the products against colour changes during transglycosylation. Phosphoric acid substitutes are comprised of the hypophosphite groups obtained from hypophosphorous acid, the dihydrogen phosphide and hydrogen phosphide groups obtained from phosphorous acid and the phosphate groups obtained from phosphoric acid. Because the products are white, they can be used in gluing, for example, of paper products or cardboard products, whose opacity is relatively poor without the glue showing through.

As regards the structure and biodegradability of a transglycosylation product, the reaction can be steered according to the invention so it influences the preservation/fragmentation of the acetate group in the C6 carbon. In literature it has been demonstrated that the acetate group at a C6 carbon has the effect of lowering enzymatic biodegradability. We have surprisingly found that mechano-chemically performed transglycosylation also affects the mutual relations of the acetyl groups in the anhydroglucose unit in positions C-2, C-3 and C-6.

By way of a summary of the differences between the extrusion technique used in the invention and the resulting reactions and products, and conventional techniques and products, the following may be stated:

The amount of the reagent can be reduced by more than 95% when compared to the batch reaction The reaction time can be considerably shortened The yields of polymeric, hydrophobic products are higher than those produced by the batch process in which more water-soluble products are created The acetyl groups are better preserved when hypophosphoric acid is used When hypophosphoric acid is used, the phosphorus binds itself chemically to the product, i.e. provides the transglycosylation product with an anionic function, which can, for example, be used to influence the compatibility of the product with respect to various materials and dispersion.

The colour is lighter, i.e. the thermal stability of the product is improved

The distribution of the acetyl groups in the anhydro glucose unit is different. Hydrolysis does not occur from C-6 carbon as it does in the batch process.->The polymer manufactured from this product is structurally different and where nearly all the acetyl groups are preserved, for example, polymerisation occurs, which opens the caprolacton ring in the OH group of glycol, i.e. the branching of the polymer end-product is reduced.

The examples presented below describe the production of TG products from starch acetate, which is a typical example of a starch ester. The starch ester can be made, for example, from native starches manufactured by applying hydrolysation, oxidisation, cationisation or hydroxylisation. In the present invention, the chain length of the starch ester could vary, but short chains (C1-4) are preferred, and in particular acetate is suitable.

The ethylene glycol used in the examples represents an example of the most suitable multifunctional alcohols.

Use of TG Products

The functionalised transglycosylation products of starch acetate according to the present invention can be used in glues. They are especially appropriate in the manufacture of hot-melt adhesives.

Previously, hot-melt adhesives have been made from starch acetates. Published Patent Application EP 0 603 768 discloses a method, in which a starch ester with a chain length of $C_2$-$C_{18}$, degree of substitution, DS, of 0.3-3.0, has been used for manufacturing hot-melt adhesive by plasticising the ester with non-volatile polar diluents, such as glycerol, ethoxylated phenol, ethoxylated bisphenol A, N-(2-hydroxy ethyl)-12-stearamide, the amount of this being within the range of 20-90% of the amount of the ester. The optional components of the adhesive composition include polyvinyl alcohol or ethylene/polyvinyl alcohol polymer (amount 0-35%), sizing resin (amount 0-70%) and antioxidants (amount 0-3%).

The components were mixed together using a Brabender extruder at 130-150° C. The product possesses good adhesive properties in gluing of cardboard. The starch used as the reagent may have been hydrolysed, but not extensively fragmented; a limit of <10 as given to the dextrose equivalent. In the known solution, the esters with low degrees of substitution (DS) were pre-softened with water, which was then evaporated away. The other esters were pre-softened with part of, or all of, the diluent.

A hot-melt adhesive composition made from the transglycosylation product of starch acetate is disclosed also in FI Patent Application No. 20020313.

The present invention differs from the above-mentioned starch-acetate-based hot-melt adhesives in several respects. The molecular weight of the starch-based component can be of the same order as the product disclosed in FI Patent Application No. 20020313, but the glucose polymer constituents are partly different, or (when the ester constituents are the same) their carbon atom numbers in the different glucose ring differ.

The transglycosylation products of starch acetate can also be used in the manufacture of polymers, e.g. as macro-initiators in polymerisation, which opens the ring, or in connecting oligomers to starch products. Product esterification (usually the acetylisation degree) can be used to influence the quality of the resultant polymer. The rheological properties of the polymer can be considerably influenced by the location of the polymer chains in the anhydroglucose unit. Understandably, the initialisation of polymerisation solely from positions C-2 and C-6 when compared to initialisation from positions C-2, C-3 and C-6, leads to the different orientation of the side chains, and thereby to different physical properties in the end product. Because the transglycosylation products of starch acetate contain only a few free hydroxyl groups with DS>2.5, and these are located almost solely in positions C-2 and C-3 as well as terminal groups of the carbohydrate chain, the ring-opening polymerisation or coupling reactions initiated by the OH groups can lead more in the direction of a block polymer structure than a grafting polymer structure.

Depending on the manner of polymerisation, the products have different melting and glass transition temperatures. Products with low melting points can be used as such in hot-melt adhesives without external softeners. Products with higher melt temperatures require softening.

Although the manufacture of starch ester polyester copolymers is not described in this invention from the extrusion technique point of view, with examples, nonetheless, it should be noted that such manufacture is technically possible because the products manufactured are fully compatible at 1-100% proportions with, for example, 6-caprolactone. Thus, transglycosylation can, in principle, be followed by addition of a lactone monomer, whereupon a starch ester copolyester product would be obtained as the end product.

The reaction product can also be drawn out as a band from the nozzle at the end of the reactor, cooled down, cut or ground to a powder.

When necessary, the polymeric melt can be fed into water in the form of a band, washed and then dried in hot air or by applying a vacuum.

The products obtained by implementing the invention can be used in the manufacture of polymers, e.g. as prepolymers in polyurethane synthesis, as large-sized comonomers in the condensation polymerisation of lactic acid, and as macro-co-initiators in ring-opening polymerisation of caprolactone.

In order to illustrate the invention, comparative examples are presented hereafter using known technology. The following examples are not exhaustive but shed more light on the present invention:

EXAMPLE 1

Transglycosylation of Starch Acetate by Extrusion Technology, Using Sulphuric Acid as Catalyst The tests were conducted complying with the following general procedure. The sulphuric acid used as a catalyst was dissolved in diol. The solution was mixed by spraying, using either a separate pressure vessel or a manual dosage sprayer, into the solid starch acetate in a fluidized-bed type mixer (Forberg F50) or (in the case of small batches) in an all-purpose mixer. The powderized mass obtained as a product was fed into a extruder either as such or after being compacted. If compacted, this was done using a screenplate compacter with a cooling and heating possibility for the matrix and jacket (−30 . . . +150° C.) and the dimensions of the matrix being D/d 150/70 mm and the number of apertures being typically 120.

The thickness of the matrix was typically 30 mm and aperture diameter was 5 mm. The extruder used was a 1-screw extruder (D35, L/D=25, modular screw and cylinder). The screw embodied dispersive mixing/processing components, typically of the Maddock type. Starting from midway along the screw, the compression ratio was 1:3. The operating temperature varied within the range of from 140 to 160° C., depending on the particular case. The extrusion period was typically 10-15 min. Extrusion was repeated as necessary. The test conditions and the raw materials used are described in more detail in the table below (Table 1).

TABLE 1

Reaction conditions

| Test | Starch acetate[a] AGU g | mol | Ethylene glycol g | mol | Sulphuric acid %[d] | Cylinder temperature °C. | Mixture temperature °C. | Through-put times/ extrusion | Compactio times times |
|---|---|---|---|---|---|---|---|---|---|
| Test 1 | 500 | 1.7 | 50 | 0.8 | 0.18 | 120 | 140 | 2 | — |
| Test 2 | 500 | 1.7 | 25 | 0.4 | 0.10 | 120 | 140-160 | 3 | — |
| Test 3 | 500 | 1.7 | 75 | 1.2 | 0.26 | 130 | 140 | 1 | 3 |
| Test 4 | 1000 | 3.4 | 100 | 1.6 | 0.18 | | 140-160 | 3 | — |
| Test 5 | 1220[b] | 4.2 | 80 | 1.3 | 0.06 | | 160 | 2 | — |
| Test 6$_1$ | 1000[c] | 3.4 | 37 | 0.6 | 0.04 | | 160 | 1 | — |
| Test 6$_2$ | 1000[c] | 3.4 | 37 | 0.6 | 0.04 | | 160 | 2 | — |

[a]Starch acetate manufactured from potato starch, degree of substitution 2.7; manufacturer VTT Prosessit
[b]Starch acetate dried before use for 1 h at temperature of 60° C. in a vacuum heating chamber
[c]Starch acetate dried before use for 12 h at temperature of 105° C. in a convection oven
[d]Amount of sulphuric acid as % of amount of reaction mixture
Test 6$_1$ Product extruded once
Test 6$_2$ Product extruded twice The extruded products were cleaned for analytic purposes by grinding them into a fine powder, then by mixing the powder into about 10 times the amount of water, and by stirring the mixture for 12 h. After this, the product was filtered, washed with water, and dried in a convection oven. On an average, the proportion of water-soluble reaction products was 20%. The product yields are shown in more detail in Table 2. The water-soluble products were characterised using the HPLC technique, by determining the unreacted ethylene glycol, and the proportions of anhydroglucose-based monomers and polymers on the basis of the retention times of corresponding substances. The identified by-products were acetate and acetic acid of ethylene glycol.

The molecular weight distributions of the products were analysed using GPC technique at VTT Biotekniikka. The acetyl content was determined either using NMR analytics or by hydrolysing the acetyl groups and by titrating the resultant acetic acid with an alkali.

TABLE 2

Characterisation of the products manufactured using reactive extrusion

| Test | Polymer product | | | | | Water-soluble products | | | % of reaction mixture |
|---|---|---|---|---|---|---|---|---|---|
| | Yield % | $DS_{Ac}$ | Mw g/mol | Mn g/mol | Mw/Mn | Ethylene glycol | 1 AGU | 2 AGU | Oligomers ≧3 AGU |
| Test 1 | 81.2 | 3.0[H] | 19 500 | 6 100 | 3.2 | 8.12 | 0.45 | 0.26 | |
| Test 2 | 93.7 | 3.0[H] | 18 700 | 7 000 | 2.6 | 4.64 | 0.30 | 0.18 | |
| Test 3 | 84.8 | 3.0[H] | 9 800 | 5 100 | 1.9 | 10.2 | 0.52 | 0.33 | |
| Test 4 | 81.4 | | 26 300 | 7 700 | 3.4 | 8.10 | 0.27 | 0.20 | 8.2 |
| Test 5 | 72.6 | 2.2[NMR] | 10 937 | 4 970 | 2.2 | 4.00 | 0.33 | 0.16 | 8.0 |
| Test 6$_1$ | | | 322 835 | 43 771 | 7.4 | | | | |
| Test 6$_2$ | 95.1 | | 290 735 | 41 798 | 6.9 | 2.68 | traces | traces | 0.5 |

[H]Hydrolytically determined,
[NMR] NMR determined
$DS_{Ac}$: Degree of substitution of acetyl groups
AGU: Anhydro Glucose Unit
Test 6$_1$ Product extruded once
Test 6$_2$ Product extruded twice The NMR technique was used to determine the amount of combined ethylene glycol. The product as per Test 5 had bound to it 3 mol-% of ethylene glycol, which corresponds to a polymerisation degree DP=34, assuming that ethylene glycol is the polymer's terminal group. The result is of the same order as the molecular weight determinations made using GPC.

EXAMPLE 2

Comparative Example of Performing Transglycosylation Reaction without Extrusion

Starch acetate (6.8 kg), made from potato starch and with a degree of substitution, DS, of 2.8, was added to a 50 litre Lödige reactor and mixing was activated (mixer/homogenizer 85 rpm/1500 rpm). Ethylene glycol (6.4 kg) was added (with 14 g of 93% sulphuric acid having been added to it). The reaction mixture was mixed for 30 minutes and then the vacuum was switched on and heating of the reactor was launched to bring it to the temperature of 110 to 120° C., at which temperature the reaction mixture was kept for 75 minutes. After the reaction, the vacuum pump was switched off and the product was precipitated from the water while being stirred. The reaction mixture was ground in water and a white powdery product was filtered and the excess ethylene glycol was washed away with water. The yield of cleaned product was about 60% and the molecular weight, Mw, was 12,564 g/mol, which is of the same order as that of the products as per Test 5 in Example 1.

When comparing the results of Examples 1 and 2, it can be seen that the transglycosylation reaction of starch acetate can be carried out by extrusion technique by using only 3.7-15% of the diol component calculated, compared to the amount of starch acetate, whereas in the case of the comparison example (method according to FI Patent Application No. 20020313) it was necessary to use starch acetate and diol component in a mass ratio of almost 1:1 in order to obtain corresponding results.

NMR technique was applied in studying the product manufactured in this comparative example 2 (method according to FI Patent Application No. 20020313) and using extrusion technology to determine the acetyl group content of the product and the location of the acetyl groups in the anhydroglucose unit. The products were similar in terms of their degree of polymerisation. The results are shown in Table 3.

TABLE 3

Effect of manufacturing technique on the distribution of transglycosylation product acetyl groups in the anhydroglucose unit

| Test | Mw (GPC) | DP (NMR) | $DS_{Ac}$ tot | $DS_{Ac}$ C-2 | $DS_{Ac}$ C-3 | $DS_{Ac}$ C-6 | Glycol β % of AGU |
|---|---|---|---|---|---|---|---|
| Example 1, Test 5 | 10,937 | 43 | 2.21 | 0.72 | 0.70 | 0.79 | 1.2 |
| Example 2: (comparison) | 12,564 | 47 | 2.43 | 0.88 | 1.01 | 0.53 | 1.0 |

Configuration of C-1 Anomeric Carbon Combined with Glycol
AGU: Anhydro Glucose Unit
DP: Average degree of polymerization
$DS_{Ac}$: Degree of substitution of acetyl groups Product analysis shows that the distribution of the acetyl groups in a product manufactured applying extrusion technology is different to that of the product as per the comparison example in which significant fragmentation of acetyl groups from C-6 carbon has occurred. The distribution of the acetyl groups in the extrusion-technical product is more even. When using transglycosylation products as the raw material of polymers, the structure of the polymers can be influenced by the distribution of the acetyl groups in those cases in which the reaction begins from free hydroxyl groups.

EXAMPLE 3

Transglycosylation of Starchh Acetate Applying Extrusion Technology, with Hypophosphoric Acid as Catalyst A procedure similar to that used in Example 1 was employed. The reagents were 1000 g of starch acetate (DS 2.8), 0.05 kg of ethylene glycol and 5 g of hypophosphoric acid dissolved in ethylene glycol. Extrusion took place at a temperature of 170 to 180° C. and the extrusion period was 10-15 min. The mixture was passed through the extruder twice. Determined using the GPC technique, the molecular weight of the product was: Mw 176,125 g/mol, Mn 22,655 g/mol and Mw/Mn 7.8. The product was distinctly lighter in colour than the products according to Example 1, i.e. the choice of the acid catalyst can be used to influence the thermal resistance of the product during extrusion. The product was cleaned by dissolving in acetone and by precipitation from water and then by drying. NMR spectroscopic characterisation ($^{31}$P spektrum) revealed that about 60% of the phosphoric acid catalyst used had combined chemically with starch acetate. When examining the acetyl content of the product by means of NMR spectroscopy, it was observed that the acetyl content had been preserved extremely well. Table 4 shows the distribution of the acetyl groups.

TABLE 4

Distribution of the acetyl groups in the product manufactured by using hypophosphoric acid as catalyst and extrusion technique

| Carbon atom | DS | Determination - Quantitative $^{13}$C-NMR |
|---|---|---|
| C-2 + C-3 + C-6 | 2.77 (DStot) | Ratio between acetyl signals (176 ja 23 ppm) and C-1 signals (97-103 ppm |
| C-2 | 0.81 | 98 ppm (ratio of signals to all C-1 signals) |

TABLE 4-continued

Distribution of the acetyl groups in the product manufactured by using hypophosphoric acid as catalyst and extrusion technique

| Carbon atom | DS | Determination - Quantitative $^{13}$C-NMR |
|---|---|---|
| C-3 | 0.9-1.0 | $DS_{tot} - DS_{C-2} - DS_{C-6}$ |
| C-6 | 0.9-1.0 | Almost entirely acetylated |

On basis of the results obtained, the polymer body of the product contains free OH groups in the C-2 position, an average of one for every five anhydroglucoses and one chemically-combined phosphorus for an average of every seventy anhydroglucoses.

EXAMPLE 4

Effect of Amount of Hypophosphoric Acid on Starch Acetate Extrusion Technique and Transglycosylation Reaction A similar test as in Example 3 was performed, but the amount of phosphoric acid used was only half the previous amount. The amounts of the other reagents were the same. The reaction time was 15 min and the operating temperature of the extruder was 170-180° C. Extrusion was carried out twice.

The molecular weight of the product was determined by using GPC technique at VTT Biotekniikka. On the basis of the result (Mw 199,062 g/mol, Mn 20,896 g/mol and Mw/Mn 9.5) it becomes apparent that the amount of the acid component can be used to influence the molecular weight and molecule distribution of the transglycosylation product.

EXAMPLE 5

Manufacturing of Hot-Melt Adhesive from a Transglycosylation Product Using Both the Batch Process and Extrusion Technology, and Determination of Adhesive Properties Transglycosylation products (purified product according to Example 2=Adhesive 1; purified product according to Example 1, Test 5=Adhesive 2; and reaction mixture according to Example 3 but unpurified=Adhesive 3) were used to manufacture hot-melt adhesives by mixing 100 g of transglycosylation product and 70 g of triethyl citrate. After mixing, the adhesive mixture was kept over the night at 80° C. in a heating chamber. Then the temperature was raised to 135° C., at which temperature the adhesive was kept for 4 h and then the adhesives were examined for their melt viscosity (Cone & Plate Viscometer, Research Equipment London Ltd). After this, the viscosity was measured at intervals of 1 h. Rate was 100 rpm and the temperature 150° C.

The following table (Table 5) shows the results of viscosity measurements.

TABLE 5

Viscosity of hot-melt adhesives as a function of time

| Adhesive | Viscosity, P. Measurement at 150° C., 100 rpm | | | | | |
|---|---|---|---|---|---|---|
| | 4h/135° C. | 5h/135° C. | 6h/135° C. | 7h/135° C. | 8h/135° C. | 9h/135° C. |
| Adhesive1 | 3.9 | 3.2 | 4.2 | 4.1 | 4.2 | 4.3 |
| Adhesive2 | 5.2 | 3.4 | 3.6 | 3.6 | 3.5 | 3.5[a] |
| Adhesive3 | 14.0 | 14.0 | — | 14.0 | 14.4 | 14.7 |

[a]Measurement after 10 h

When comparing Adhesives 1 and 2, where both purified transglycosylation products were used for manufacturing purposes, it can be seen that the viscosity level is of the same order; likewise the viscosity stability in the conditions was similar, in line with expectations, due to the similar molecular weights. The results of the test indicate that adhesives with matching viscosities can be manufactured using a purified product manufactured in either way. However, better product yields are obtained from products manufactured applying extrusion technology when compared to batch reaction, in which more water-soluble products are formed.

When compared to Adhesives 1 and 2, Adhesive 3 has a higher viscosity as well as a greater molecular weight. It is noteworthy that an unpurified extrusion product was used in manufacturing this adhesive. Nevertheless, the viscosity stability of the adhesive is good, which indicates that the manufacture of a stable adhesive formulation does not necessarily require a purification stage, and this clearly has an effect on the processing costs.

Good stability is also shown by the fact that colour is retained at the original yellowish level throughout the heating process, even though, in this case, the adhesives were stored between measurements in open containers in the heating chamber (135° C.).

If the melt adhesive is manufactured using unwashed reaction mixture in which sulphuric acid has been used as the catalyst, the resultant product is a brownish adhesive, which becomes darker in colour upon heating as can be expected.

The adhesive properties of the hot-melt adhesive were tested by spreading the adhesives in a molten state on the surface of a piece of paper and by immediately pressing a second piece of paper over the adhesive. When the adhesive seam had cooled down, the glued papers were drawn away from each other whereupon the result was a 100% fibre tear in the paper in the case of all three adhesives, i.e. the gluing was successful.

The invention claimed is:

1. A process for manufacturing transglycosylation products, comprising the steps of:
reacting a starch ester or starch ether at acidic conditions with an alkanol containing 1 to 6 hydroxyl groups in the presence of an acidic catalyst consisting essentially of at least one of phosphoric acid, $H_3PO_4$, hypophosphorous acid, $H_3PO_2$, and phosphorous acid, $H_3PO_3$ in a transglycosylation reaction wherein the catalyst is allowed to chemically bond with the transglycosylation product to form a reaction mixture, and
recovering a transglycosylation product, or subjecting the transglycosylation product to further processing, characterized in that
the reaction is performed in a reactive extrusion process essentially without any medium, and
the reaction mixture is conducted through an extrusion device via at least two separately adjustable heating zones, thereby providing control of heat introduced externally into the reaction mixture.

2. The process according to claim 1, wherein the extrusion temperature is within the range of approximately 105 to 200° C.

3. The process according to claim 1, wherein prior to the transglycosylation reaction, the alkanol and the acidic catalyst are mixed together to form a first reaction mixture, thereby producing an aerosol, wherein the aerosol is added to the starch derivative at a dose corresponding to a desired molar mass of the transglycolsytion product to produce a pre-mixture.

4. The process according to claim 3, wherein the amount of the alkanol is approximately 0.01 to 20 weight-%, of the mass of the starch ester or the starch ether, and wherein the amount of the alkanol is approximately 0.0005 to approximately 5 mole-% of the amount of the starch ester or the starch ether.

5. The process according to claim 3 or 4, wherein the alkanol and the acidic catalyst are supplied in aerosol form to a fluidised-bed mixing device, wherein the alkanol and acidic catalyst are mixed with a powdery starch derivative to produce the pre-mixture.

6. The process according to claim 3, wherein the concentrations of the alkanol and the acidic catalyst and of any liquid chemicals are selected such that the total amount of liquid is less than 30% wt-% of the dry matter content of the pre-mixture.

7. The process according to claim 2, wherein the reaction mixture is compacted yielding a compacted pre-mixture, prior to supplying the reaction mixture to the extrusion device.

8. The process according to claim 7, wherein the compacted pre-mixture is supplied to the extrusion device to serve as the reaction mixture, wherein the extrusion device is either a 1- or 2-screw type extrusion device.

9. The process according to claim 1, wherein the starch ester or starch ether comprises a product manufactured from native starch by means of oxidizing, hydrolyzing, cross-linking, cationizing, grafting, etherification or esterification.

10. The process according to claim 1, wherein the alkanol is a lower alkanol with 1 to 6 carbon atoms and 1 to 5 hydroxyl groups.

11. The process according to claim 10, wherein the alkanol is selected from at least one of the group consisting of: methanol, ethanol, n-propanol, isopropanol, n-butanol, sec butanol, methoxy ethanol, ethoxy ethanol, methoxy methanol, ethoxy methanol, ethylene glycol, propylene glycol and glycerol.

12. The process according to claim 1, wherein the extrusion temperature is within the range of approximately 110 to 190° C.

13. The process according to claim 3, wherein the amount of the alkanol is approximately 0.1 to 10 weight-% of the mass of the starch ester or the starch ether.

14. The process according to claim 3, wherein the amount of the alkanol is approximately 0.002 to approximately 2.0 mole-% of the amount of the starch ester or the starch ether.

15. The process according to claim 3, wherein the amount of the alkanol is approximately 0.015 to 0.3 mole-% of the amount of the starch ester or the starch ether.

16. The process according to claim 3, wherein the concentrations of the alkanol and the acidic catalyst and of any liquid chemicals are selected such that the total amount of liquid is approximately 5 to 25% wt-% of the dry matter content in the pre-mixture.

17. The process according to claim 2, wherein the reaction mixture is compacted and granulated prior to feeding it into the extrusion device.

18. The process according to claim 1, wherein the alkanol is a lower alkanol with 1 to 6 carbon atoms and 1 to 3 hydroxyl groups.

19. The process according to claim 10, wherein the alkanol is selected from the group consisting of: a substituted lower alcohol, an alcohol containing two hydroxyl groups, and an alcohol containing three hydroxyl groups.

20. The process according to claim 1, wherein said acid catalyst consists of at least one of phosphoric acid, $H_3PO_4$, hypophosphorous acid, $H_3PO_2$, and phosphorous acid, $H_3PO_3$.

21. The process according to claim 1, wherein a color of the transglycosylation product is retained throughout the heating process.

22. The process according to claim 1, wherein the transglyslation end-product lacks color or is white.

23. The process according to claim 1, wherein the acid catalyst consists of hypophosphorous acid, $H_3PO_2$.

24. The process according to claim 1, wherein the acid catalyst consists of phosphorous acid, $H_3PO_3$.

* * * * *